(12) United States Patent
Tran et al.

(10) Patent No.: US 9,894,604 B1
(45) Date of Patent: Feb. 13, 2018

(54) AUTOMATED WIRELESS ACCESS POINT SELECTION

(71) Applicant: Amazon Technologies, Inc., Reno, NV (US)

(72) Inventors: Binh Quoc Tran, Los Altos, CA (US); Jin Guo, Cupertino, CA (US); Shengwei Zhang, Fremont, CA (US); Shao-Cheng Wang, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 231 days.

(21) Appl. No.: 14/665,814

(22) Filed: Mar. 23, 2015

(51) Int. Cl.
*H04W 48/20* (2009.01)
*H04W 36/08* (2009.01)
*H04W 12/08* (2009.01)
*H04W 84/12* (2009.01)

(52) U.S. Cl.
CPC .......... *H04W 48/20* (2013.01); *H04W 12/08* (2013.01); *H04W 36/08* (2013.01); *H04W 84/12* (2013.01)

(58) Field of Classification Search
CPC .............................. H04W 36/08; H04W 48/20
See application file for complete search history.

(56) References Cited

U.S. PATENT DOCUMENTS

| 8,116,285 | B1 | 2/2012 | Barnum | |
|---|---|---|---|---|
| 2008/0014934 | A1* | 1/2008 | Balasubramanian | H04W 84/12 455/434 |
| 2009/0135784 | A1* | 5/2009 | Horn | H04W 36/0055 370/331 |
| 2010/0309815 | A1* | 12/2010 | Yepez | H04L 12/4625 370/254 |
| 2012/0113971 | A1* | 5/2012 | Giaretta | H04W 48/20 370/338 |
| 2012/0196644 | A1* | 8/2012 | Scherzer | H04W 72/02 455/524 |
| 2013/0097710 | A1* | 4/2013 | Basavapatna | H04W 4/02 726/25 |
| 2013/0318613 | A1* | 11/2013 | Archer | G06F 21/577 726/25 |
| 2015/0131483 | A1* | 5/2015 | Colban | H04W 48/16 370/254 |
| 2015/0208337 | A1* | 7/2015 | Wuellner | H04W 48/20 370/252 |

* cited by examiner

*Primary Examiner* — Scott M Sciacca
(74) *Attorney, Agent, or Firm* — Pierce Atwood LLP

(57) ABSTRACT

Approaches enable a device capable of wireless communication, such as a device having a wireless adapter, to automatically select and connect to an available wireless access point (AP) having favorable performance, security, and/or other attributes that may be ascertained through various parameters, despite the wireless AP not being the last-known and/or last-connected-to wireless AP. The wireless-enabled device may determine the wireless AP to connect to in a number of ways, such as by determining all available wireless APs in the vicinity of the device and identifying, ranking and/or scoring the parameters for some or all of the available wireless APs to determine a ranking of the wireless APs. Once a favorable wireless AP is identified, the device may automatically attempt to connect to the wireless AP. If the wireless AP is not available, the device may automatically attempt to connect to the next wireless AP in the ranked list, etc.

18 Claims, 8 Drawing Sheets

AUTOMATED WIRELESS ACCESS POINT SELECTION

BACKGROUND

People are increasingly seeking to be connected to the Internet at all times with their cellphones, laptops, tablets, and other devices. While cellular networks, such as those provided by AT&T, Verizon, and others are ubiquitous and easily accessible, wireless networks, such as Wi-Fi, are a popular alternative for connecting to the Internet. Wi-Fi is often faster than cellular data connections and is rarely accompanied by any type of data cap or overage charge. After a device connects to a wireless network, such as a Wi-Fi access point (AP), then disconnects (e.g., by leaving the vicinity of the wireless AP), standard device behavior is to always reconnect to the last-known AP if it is available when a new connection is sought, such as by joining the last-known SSID the device connected to. Often there may be other wireless networks in the vicinity that offer better security settings or faster, more robust (e.g., reliable) network connections.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for wireless AP selection procedures for an electronic device. In particular, various embodiments enable automated techniques for a computing device to automatically select and connect to an optimal wireless AP out of any number of available wireless APs.

Various approaches described herein enable a computing or other electronic device, such as a wireless-enabled device (e.g., a device having a Wi-Fi adapter), to automatically select and connect to an available wireless AP having favorable performance, security, and/or other attributes that may be ascertained through various parameters (e.g., parameters, metrics, and/or settings that indicate a wireless AP with high security and a robust, fast connection to the Internet), despite the wireless AP not being the last-known and/or last-connected-to wireless AP. The wireless-enabled device may determine the wireless AP to connect to in a number of ways, such as by determining all available wireless APs in the vicinity of the device, and identifying parameters (e.g., parameters, metrics, and/or settings) for some or all of the available wireless APs. For example, wireless security settings, RSSI values, physical layer (PHY) rates, quality of service (QoS) settings, Internet access availability determinations, Internet connection quality values, wireless AP standard determinations, and wireless AP frequency band determinations, among others.

Figure 1:
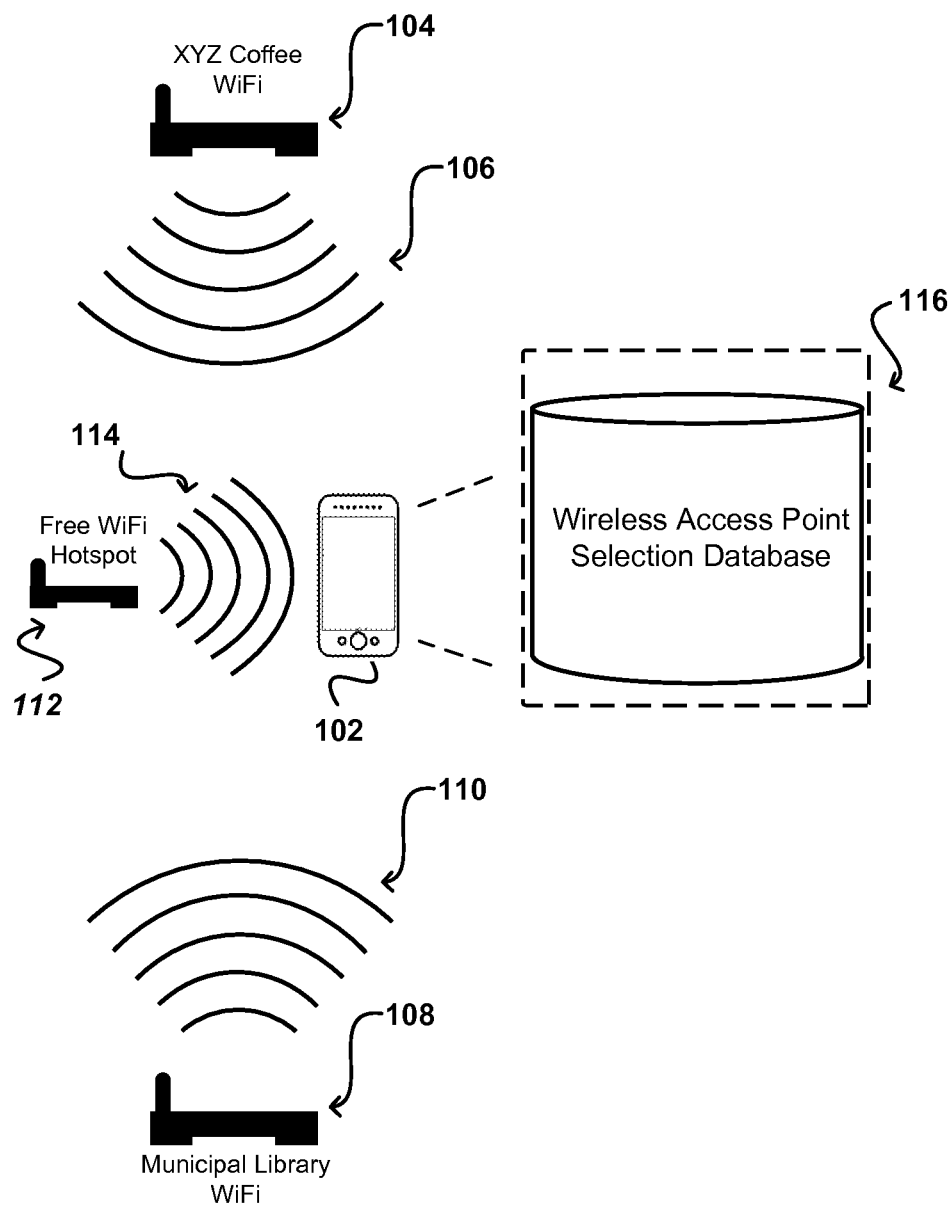
FIG. 1 illustrates use of an example wireless AP selection database to automatically select and connect to a wireless AP, in accordance with various embodiments.

According to an embodiment, and as illustrated in the example situation 100 of FIG. 1, once the parameters are either determined by, for example, parsing a broadcast 106, 110, 114 from one or more of the wireless APs 104, 108, 112, retrieved from storage on the device 102 (e.g., from a database), and/or updating previously-stored parameters for a particular wireless AP, as may be retrieved from a wireless AP selection database 116 or other such source, then one or more of the wireless APs may be compared, for example by ranking one or more of the parameter(s) associated with the wireless APs (e.g., from best to worst), or assigning scores based on the parameter values and using the scores to determine a ranking of the wireless APs (e.g., in order of connection preference), or some other method. Once a favorable wireless AP is identified (e.g., at the top of a ranked list), the device may automatically attempt to connect to the wireless AP. If the wireless AP is not available, then the device may automatically attempt to connect to the next wireless AP in the ranked list, etc.

Accordingly, approaches in accordance with various embodiments improve the operation and performance of the computing device on which they are implemented by, among other advantages, automatically identifying one or more wireless APs 104, 108, 112 available for connection (other than simply joining a last-known wireless AP) that offer optimal performance and/or other features, such as highly secure connections and Internet access. In addition, automatically identifying the "best" wireless APs and connecting to them without requiring user intervention may optimize battery life, processor load, and wireless throughput of the computing device, in addition to saving time. Various other applications, processes, and uses are presented below with respect to the various embodiments.

Figure 2A:
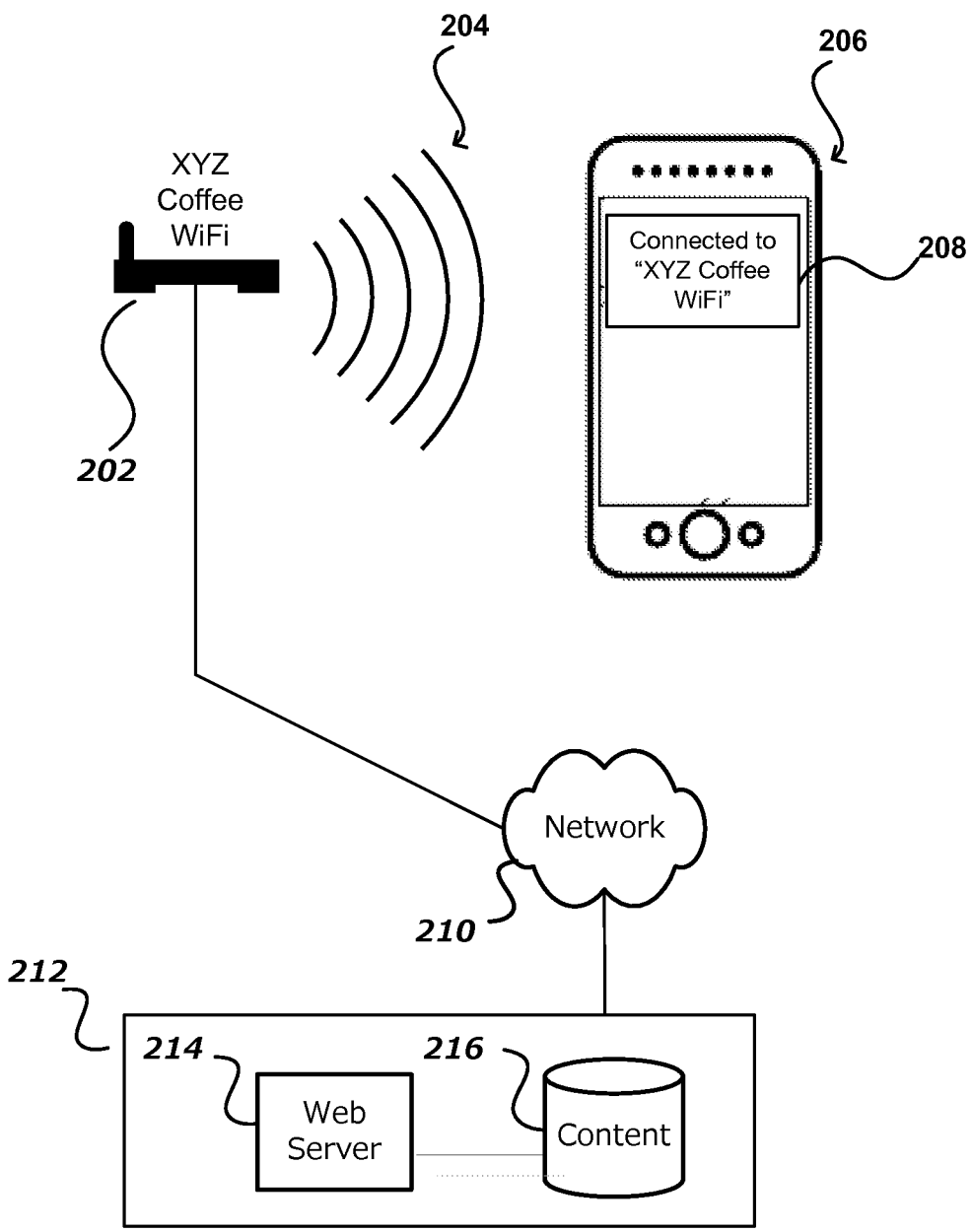
FIGS. 2A and 2B illustrate examples of computing devices that are connected to a wireless AP and looking to connect to one of several available wireless APs, respectively, in accordance with various embodiments.

FIG. 2A illustrates an example 200 of a computing device 206 that is connected to a wireless AP 202 that offers a connection to the Internet, in accordance with various embodiments. While only one wireless AP 202 is present in the example illustrated in FIG. 2A, there could be any number of wireless APs in the vicinity of the device 206 and available for connection. Although a portable electronic device 206 (e.g., a smart phone, tablet, or e-book reader) is shown, it should be understood that other types of electronic devices (e.g., personal computers, set top boxes, smart televisions, video game systems, etc.), or any device capable of wireless data communication and receiving, determining, and/or processing input, can utilize aspects of the various embodiments, as should be apparent in light of the teachings and suggestions contained herein. In the example of FIG. 2, the electronic device 206 is configured to communicate wirelessly with other computing devices through Wi-Fi wireless technology. The device 206 is configured to detect Wi-Fi APs (such as XYZ Coffee Wi-Fi 102) that are within range of the device 206. The device 206 can also connect to any detected APs either automatically or based on input from a user (not pictured). APs can be any device (e.g., wireless routers, hotspots, antennas, etc.) that allow the device 206 to connect to a network 210 (e.g., the Internet).

Once connected to an AP 202, the device 206 is able to send and receive data wirelessly 204 through the network 210 (e.g., the Internet). With a WAN connection, the device 206 is also able to communicate with a remote networked environment 212. For example, as shown in FIG. 2, a wireless network connection 204 provides access to the networked environment 212 over an appropriate network 210, where in this example, the networked environment 212 includes a Web server 214 for receiving requests and serving content in response thereto, although for other networks, an alternative device serving a similar purpose could be used, as would be apparent to one of ordinary skill in the art. Access to networked environment 212 can allow a user to perform tasks such as obtaining data from an appropriate data store 216, among others. Examples of data obtained from an appropriate data store 216 can include electronic mail, map data, instant messages, and voicemails, among other examples.

In the example of FIG. 2A, the device 206 is connected to the wireless AP 202, which in this example is identified as "XYZ Coffee WiFi" (e.g., the network service set identifier (SSID)). The device indicates 208 that it is connected to the Wi-Fi network "XYZ Coffee WiFi". In some embodiments, the device 206 can be configured to collect data (e.g., parameters, metrics, measurements, etc.) describing access points (e.g., wireless AP 202) that are detected by the device 206 at various locations; for example, in the vicinity of the device 206. The device 206 can be configured to collect data describing detected APs at specified time intervals (e.g., hourly or daily) or automatically, for example, anytime a new AP is detected by the device 206. The device 206 can store the data, along with information describing the names or identifiers of the detected APs, respective timestamps of when the APs were detected, respective counts of how often any given AP was detected by the device 206, respective counts of how often the device connected to any particular AP, among other things.

Generally, wireless AP selection proceeds in one of two ways. First, a wireless client will always re-connect, or "stick," to that device's last-known wireless network when establishing a wireless connection, e.g., a Wi-Fi connection. For example, a wireless client generally will pick its last-known SSID (e.g., the last Wi-Fi network it connected to), as long as it can "see" that network (e.g., the network is available for connection). This behavior has many drawbacks. For example, in a case where the last-known wireless AP has a very weak signal, and another wireless AP available for connection nearby has a very strong signal, then the client will pick the last-known wireless AP with a weak signal instead of automatically determining that the wireless AP with the strong signal is preferable and connecting to it. This creates a bad user experience (e.g., slow throughput, high packet error rate, frequent disconnections, etc.), and is inefficient because it requires the user to manually identify a "best" wireless network and seek out a connection to it. Also, the last-known network may have poor or no security, as compared to another available network (e.g., the last-known network has no security protocols and other available networks offer WPA2 Personal). A user who is automatically connected to an unsecured or poorly-secured wireless network may have their privacy and data compromised.

Second, a wireless client may use RSSI as a sole evaluation metric when choosing between wireless APs with the same SSID. Current default behavior for wireless devices, when faced with more than one wireless AP with the same SSID, is to select the wireless AP with the highest (e.g., best) received signal strength indication (RSSI). This is a drawback, because using a higher RSSI to decide on a wireless AP does not always bring the best results. For example, there may be two wireless APs with the same SSID. One is a 802.11n AP and has a RSSI of −40 dBm, and the other is a 802.11ac AP with a RSSI of −45 dBm. In this example, the wireless client will pick the 802.11n AP, which may result in poor performance, because even at a lower RSSI, the 802.11ac AP actually has much higher throughput at the RSSI range used in this example and would provide better performance. In another example, there are two wireless APs with the same SSID. One is a 802.11g AP with a RSSI of −70 dBm, and the other is a 802.11b AP with a RSSI of −75 dBm. Default standard behavior is for the wireless client to pick the 802.11g AP, even though at this low RSSI range, the lower 2.4 GHz band associated with the 802.11b AP is more robust than the 5 GHz band associated with the 802.11g AP. It would be advantageous and improve the functioning of the wireless device 106 if the "best" AP were automatically selected, for example from a list of available AP candidates. Therefore, current approaches have numerous drawbacks and flaws, which are addressed by the techniques described herein.

Figure 2B:
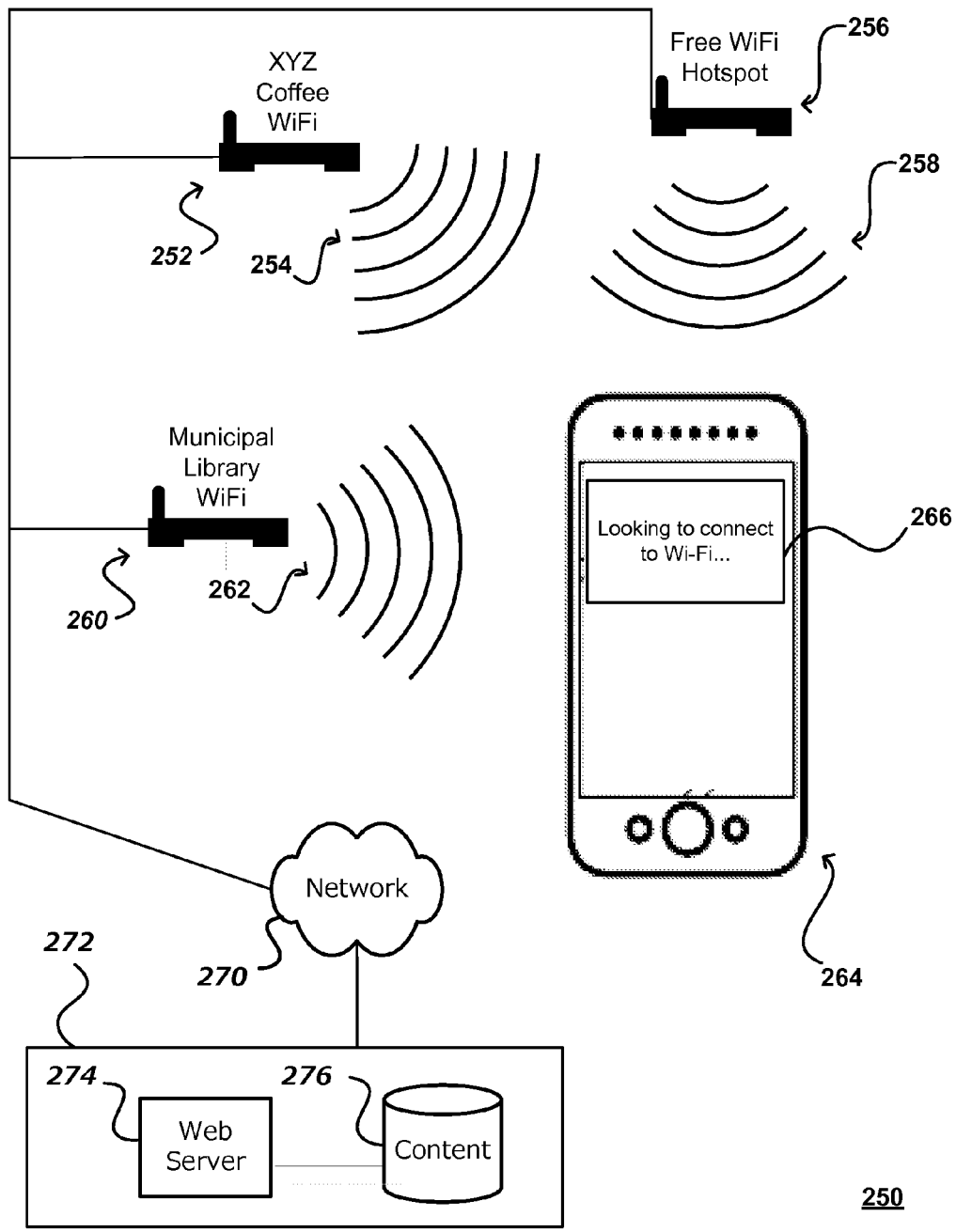

FIG. 2B illustrates an example 250 of a computing device 264 that is looking to connect 254, 258, 262 to one of several available wireless APs 252, 256, 260, including a last-joined wireless AP 252, some or all of the wireless APs offering a connection to the Internet, in accordance with various embodiments. As shown in the example situation 250 of FIG. 2, the wireless-enabled computing device 264 is not connected to a wireless AP, as reflected by a notice 266 on the display of the computing device 264. In the example of FIG. 2B, the computing device 264 was previously connected 254 to wireless AP 252, which has a SSID of "XYZ Coffee Wi-Fi" 252. The device then left the vicinity of "XYZ Coffee Wi-Fi" 252 and disconnected from "XYZ Coffee Wi-Fi" 252. For example, the owner of the computing device 264 went home. Upon returning to a location in the vicinity of "XYZ Coffee Wi-Fi," 252 computing device 264 detects several wireless APs 252, 256, 260 available to connect to, including the previously-known SSID "XYZ Coffee Wi-Fi," 252 "Municipal Library Wi-Fi," 260 and "Free Wi-Fi Hotspot" 256.

According to various embodiments, computing device 264 will not automatically connect to the last-known SSID, "XYZ Coffee Wi-Fi," 252 and instead will utilize techniques described more fully herein to automatically connect to one of the available wireless APs 252, 256, 260 that offers optimal performance and features (e.g., the available wireless APs 252, 256, 260 are evaluated and ranked in order of best to worst, based on the evaluation criteria, and the highest-ranked wireless AP is selected to connect to). As an example, "XYZ Coffee Wi-Fi" 252 may have a weaker security setting than "Municipal Library Wi-Fi" 260 and "Free Wi-Fi Hotspot" 256 (e.g., WEP vs. WPA2); therefore, even though computing device 264 last connected to "XYZ Coffee Wi-Fi" 252, it is preferable for computing device 264 to connect to one of "Municipal Library Wi-Fi" 260 and "Free Wi-Fi Hotspot" 256 if they offer WPA2 security instead of WEP.

Once connected to a wireless AP 252, 256, 260, the device 264 is able to send and receive data wirelessly 254, 258, 262 through the network 270 (e.g., the Internet). With a WAN connection, the device 264 is also able to communicate with a remote networked environment 272. For example, as shown in FIG. 2B, a wireless network connection 254, 258, 262 provides access to the networked environment 272 over an appropriate network 270, where in this example, the networked environment 272 includes a Web server 274 for receiving requests and serving content in response thereto, although for other networks, an alternative device serving a similar purpose could be used, as would be apparent to one of ordinary skill in the art. Access to networked environment 272 can allow a user to perform tasks such as obtaining data from an appropriate data store 276, among others.

Figure 3:
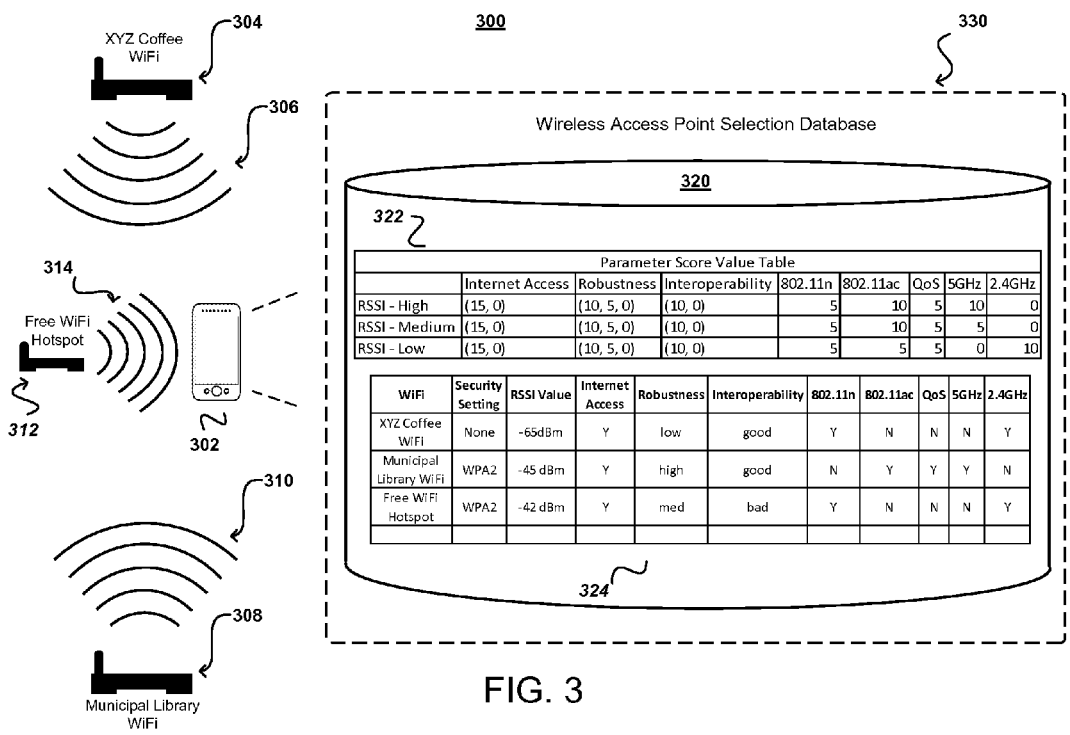
FIG. 3 illustrates an example wireless AP selection database used as part of a process to automatically select and connect to a wireless AP, in accordance with various embodiments.

FIG. 3 illustrates an example 300 wireless AP selection database 320 used as part of a process to automatically select and connect to a wireless AP 304, in accordance with various embodiments. In various embodiments, one or more databases (or any form or type of data storage) may be used as part of the techniques described herein. In the example of FIG. 3, a wireless device 302 is seeking a Wi-Fi connection, and several wireless APs 304, 308, 312 are each offering a wireless connection 306, 310, 314 to the device 302.

According to an embodiment, the device 302 utilizes various parameters associated with the available wireless APs 304, 308, 312 (e.g., settings, data, measurements, etc.) in order to determine which available wireless AP 304, 308, 312 to connect to. For example, the parameters may be maintained in one or more tables 322, 324 in a database 320 that is kept in storage 330 on the device 302, although any type of data storage approach may be utilized. The parameters associated with the available wireless APs 304, 308, 312 may be gathered by current or past "scanning" of the available wireless APs 304, 308, 312 ("pre-connection"), or, if the device has previously connected to the wireless APs 304, 308, 312, the device 302 may use previously-gathered parameters ("post-connection") about the available wireless APs 304, 308, 312, for example from the database 320. "Pre-connection" information that is determined by scanning the available wireless APs 304, 308, 312 may comprise parameters such as the wireless security settings of the AP, Quality of Service (QoS) settings, RF Band, Wi-Fi standards, etc. "Post-connection" information that is determined once a device 302 has connected to, and transferred data between, a wireless AP may comprise parameters such as Interoperability, Robustness, Internet Access, etc., and may be stored 330 on the device 302.

According to various embodiments, a device 302 may identify a "best" wireless AP for connection by first determining a wireless security setting associated with each of the available wireless APs 304, 308, 312. Wireless security is designed to prevent unauthorized access or damage to computers using wireless networks. Some wireless security settings in use, or wireless security standards that can be utilized by, wireless APs may be: Wired Equivalent Privacy (WEP), Wi-Fi Protected Access (WPA and WPA2) security protocols, Temporal Key Integrity Protocol (TKIP), Extensible Authentication Protocol (EAP), Lightweight Extensible Authentication Protocol (LEAP), and Protected Extensible Authentication Protocol (PEAP), although other kinds or types of security settings or identifiable techniques currently in use (e.g., SSID hiding, MAC ID filtering, Static IP addressing, etc.) or developed in the future may be utilized in the techniques described herein for choosing a wireless AP. In some embodiments, these may not be settings per se but instead standards or protocols utilized by a device that may or may not be configurable by a user or other such entity.

According to various embodiments, a list of various wireless security settings that may be associated with wireless APs is stored, for example in database 320, and may be ranked in order of desirability (e.g., from most secure to least secure), such as by associating a numerical ranking to the particular wireless security setting or some other technique. As part of the wireless AP selection process, a device 302 identifies one or more available wireless APs 304, 308, 312, and determines a wireless security setting associated with the one or more available wireless APs 304, 308, 312. In the example of FIG. 3, device 302 may scan an available wireless AP 304, 308, 312 to determine the wireless security setting, or may access an entry in the database 320 (e.g., in a table 324 of stored parameters) associated with the available wireless AP 304, 308, 312 that was created as a result of a previous scan of, or connection to, the available wireless AP 304, 308, 312 under consideration.

In the example of FIG. 3, device 302 has identified three available wireless APs 304, 308, 312, and determines a wireless security setting associated with each by accessing the example database table 324 in the selection database 320 in storage 330 on the device 302, where the wireless security setting previously determined for the respective APs were stored after being acquired, such as by a scan or by a previous connection. In other embodiments, device 302 may perform a scan of the available wireless APs 304, 308, 312 to determine a wireless security setting associated with each (e.g., by receiving a broadcast message from the available wireless APs 304, 308, 312 that advertises what, if any, wireless security setting is associated with the AP). Turning back to the database table 324, of FIG. 3, the device 302 determines that "XYZ Coffee Wi-Fi" 304 has no wireless security setting, "Municipal Library Wi-Fi" 308 is configured with a WPA2 wireless security setting, and "Free Wi-Fi Hotspot" 312 is configured with a WPA2 wireless security setting.

According to an embodiment, device 302 sorts the available wireless APs 304, 308, 312 according to their respective determined wireless security setting. For example, device 302 accesses database 320 to determine a ranking value for each of the respective determined wireless security settings. Then, device 302 determines the highest-ranked wireless security setting (e.g., the most secure, such as WPA2, as opposed to the least secure, such as no security) from a predetermined ranking order, and determines if any of the available wireless APs 304, 308, 312 have a matching wireless security setting. In the example of FIG. 3, "Municipal Library Wi-Fi" 308 and "Free Wi-Fi Hotspot" 312 both are configured with WPA2 wireless security. Because they have the highest wireless security setting (e.g., according to one or more entries in database 320), "Municipal Library Wi-Fi" 308 and "Free Wi-Fi Hotspot" 312 proceed to a next round of analysis. Because XYZ Coffee Wi-Fi" 304 is not configured with the WPA2 wireless security setting, "XYZ Coffee Wi-Fi" 304 is dropped from consideration to be the wireless AP to which device 302 automatically connects. In other embodiments, "XYZ Coffee Wi-Fi" 304 is not dropped from consideration, but ranked behind "Municipal Library Wi-Fi" 308 and "Free Wi-Fi Hotspot" 312 as the decision process proceeds to a next round of analysis, for example by having a lower total score value at the particular point in the procedure, based on the score value associated with the wireless security setting for "XYZ Coffee Wi-Fi" 304, or given a penalty value, or some other technique.

In other embodiments, one or more wireless security settings are each associated with a predetermined parameter score (e.g., an alphanumerical value), and the available wireless APs 304, 308, 312 are placed in a ranking order, for example, according to the score corresponding to their respective determined wireless security setting. In other embodiments, a parameter score for a particular wireless AP may be modified prior to the ranking procedure, such as by a weighting value (e.g., multiplying a numerical score by a numerical weighting value). In various embodiments, the predetermined parameter score associated with the wireless security settings may be updated, such as by a user, an administrator, or automatically, such as by a software update for the device 302.

In the example of FIG. 3, once "Municipal Library Wi-Fi" 308 and "Free Wi-Fi Hotspot" 312 proceed to a next round of analysis, a RSSI value associated with each of "Municipal Library Wi-Fi" 308 and "Free Wi-Fi Hotspot" 312 is determined. In embodiments where "XYZ Coffee Wi-Fi" 304 is not dropped from consideration, a RSSI value for it is determined as well. For example, device 302 scans "Municipal Library Wi-Fi" 308 and "Free Wi-Fi Hotspot" 312 to determine their respective RSSI values at that moment in time, or device 302 can retrieve previously-stored RSSI values for "Municipal Library Wi-Fi" 308 and "Free Wi-Fi Hotspot" 312 from database 320. In one embodiment, a predetermined parameter score is associated with each possible RSSI value, and assigned to the wireless AP accordingly as part of its total score value (e.g., added to the parameter score for its wireless security setting, according to an embodiment). In another embodiment, a predetermined parameter score is associated with one or more ranges of RSSI values, and the parameter score is assigned to the respective wireless AP (e.g., added to its total score value) based on where the RSSI value determined for the wireless AP falls, with regard to the predetermined ranges.

According to an embodiment, one or more predetermined ranges of RSSI values are stored, such as in database 320. The ranges are ranked; for example, from "best" to "worst", and as before with wireless security settings, all wireless APs in the "best" range advance to a next round of analysis while the other APs are dropped from consideration. In an embodiment, if there are no wireless APs in the highest-ranked range, then any wireless APs in the next-highest range advance to a further round of analysis.

In the example of FIG. 3, the top-ranked RSSI value range (e.g., "high") is greater than or equal to −60 dBm. The next-ranked RSSI value range (e.g., "medium") is less than −60 dBm and greater than or equal to −75 dBm. The lowest-ranked RSSI value range (e.g., "low") is less than −75 dBm. In various embodiments, the ranges are based on characteristics of the device 302, there may be more or fewer than three ranges of varying amounts, the ranges may be adaptive (e.g., based on real-time analysis of the available wireless APs 304, 308, 312), and/or the ranges may be updated, such as by a user, an administrator, or automatically, such as by a software update for the device 302. In the example of FIG. 3, both "Municipal Library Wi-Fi" 308 and "Free Wi-Fi Hotspot" 312 have RSSI values in the top-ranked RSSI value range (as determined by data stored in database 320, although a real-time scan of RSSI values may be used in various embodiments), and as a result, both "Municipal Library Wi-Fi" 308 and "Free Wi-Fi Hotspot" 312 advance to a next round of analysis.

In other embodiments, such as where "XYZ Coffee Wi-Fi" 304 was not dropped from further consideration after the first round of analysis based on wireless security settings, "XYZ Coffee Wi-Fi" 304 is not dropped from consideration at this point, but ranked behind "Municipal Library Wi-Fi" 308 and "Free Wi-Fi Hotspot" 312 as the decision process proceeds to a next round of analysis, for example by having a RSSI value in a lower-ranked range than "Municipal Library Wi-Fi" 308 and "Free Wi-Fi Hotspot" 312. In other embodiments, "XYZ Coffee Wi-Fi" 304 is dropped from consideration at this point, while in other embodiments, such as where RSSI values and/or ranges of values have a corresponding predetermined score value, "XYZ Coffee Wi-Fi" 304 may proceed for further analysis based on its total score value (e.g., the parameter value for its wireless security setting plus the parameter value for its RSSI value).

According to an embodiment, a next round of analysis is utilized to determine a ranking of available wireless APs from which one is chosen for connection. While three rounds of analysis is disclosed with respect to the example of FIG. 3, it should be understood that any number of rounds, based on varying parameters or other data, may be utilized as part of the techniques described herein. In the third round of analysis, various parameters associated with the wireless APs under consideration for selection (e.g., "Municipal Library Wi-Fi" 308 and "Free Wi-Fi Hotspot" 312) are determined (e.g., by real-time scanning, by retrieving previously-determined values from database 320, and/or updating previously-determined values with real-time values) and a parameter score for a particular parameter is assigned to the wireless AP, for example based on the value of the parameter. Each parameter score for a particular wireless AP is combined (e.g., by summing numerical parameter values) to give a total score for each wireless AP still under consideration.

In the example of FIG. 3, "Municipal Library Wi-Fi" 308 and "Free Wi-Fi Hotspot" 312 are under consideration (i.e., their ranking/order of connection preference is still being determined), and various parameter values are determined for "Municipal Library Wi-Fi" 308 and "Free Wi-Fi Hotspot" 312, and by comparing the determined parameter values with a table of parameter score values 322, a score for the particular parameter is assigned to each of "Municipal Library Wi-Fi" 308 and "Free Wi-Fi Hotspot" 312. In the example of FIG. 3, parameter values for "Municipal Library Wi-Fi" 308 and "Free Wi-Fi Hotspot" 312 are determined corresponding to: Internet Access, Robustness, Interoperability, Wi-Fi standard, QoS, and RF Band. In the example of FIG. 3, each of these parameters has a corresponding parameter score in the score value table, which is assigned based on the determined parameter value for the wireless APs. Additionally, in the example of FIG. 3, the parameter score for each parameter is different, depending on the wireless AP's RSSI value. For example, at a "high" RSSI range, a determination that a wireless AP is using the 5 GHz band receives a higher parameter score, and at a "low" RSSI range, a determination that a wireless AP is using the 2.4 GHz band receives a higher parameter score.

Turning to the example parameter score value table 322 of FIG. 3, "Internet Access" has a (15, 0) parameter score for all RSSI ranges, which means that if the particular wireless AP is connected to the Internet, the parameter score is 15. If the particular wireless AP is not connected to the Internet, the parameter score is 0. The parameter score corresponding to the actual parameter value for a particular wireless AP is assigned to the particular wireless AP as part of its total score value. In an embodiment, "Internet Access" is a Boolean value: either the particular wireless AP is connected to the Internet or not. In other embodiments, the parameter score for "Internet Access" may be weighted, for example based on historical data such as reliability, number of disconnects per hour, etc.

In the example parameter score value table 322 of FIG. 3, "Robustness" has a (10, 5, 0) parameter score for all RSSI ranges, which corresponds in this example to a ("high", "medium", "low") mapping. According to an embodiment, a "high" Robustness value may mean that the connection link quality is reliable and fast, as may be quantified in various ways (e.g., historical data and/or presently-determined data regarding throughput, throttling, channel quality, channel congestion, packet error rate, CRC error count, IEEE Wi-Fi reason code, etc.). According to an embodiment, various quantitative metrics associated with the "Robustness" parameter may each be assigned a value based on their measurement, the values then being combined to give an overall Robustness "rating," which is then compared to predetermined ranges in order to determine the overall ("high", "medium", "low") mapping. According to an embodiment, the parameter score for Internet Access may be modified (e.g., weighted, added, multiplied, etc.) by a value comprising a parameter score for the Robustness parameter.

In the example parameter score value table 322 of FIG. 3, "Interoperability" has a (10, 0) parameter score for all RSSI ranges, which corresponds in this example to a ("good", "bad") mapping. According to an embodiment, a "good" Interoperability parameter can mean that the wireless AP is determined to operate well with the device 302, and may be quantified by such measures as packet error rate, CRC error count, and IEEE Wi-Fi codes associated with disconnections, etc. While some common quantitative measures may be utilized in the determination of one or more parameter scores, in various embodiments the manner in how the quantitative measures are evaluated may be different. For example, a CRC error count may be more heavily weighted in a determination of the "Robustness" parameter than in a determination of the "Interoperability" parameter.

In the example parameter score value table 322 of FIG. 3, the Wi-Fi standard (e.g., 802.11n, etc.) used by the particular wireless AP under evaluation has different parameter scores depending on the standard, as well as the RSSI range. For example, if the wireless AP under evaluation uses the 802.11n standard, then the parameter score for all RSSI ranges is "5." If the wireless AP under evaluation uses the 802.11ac standard, then the parameter score for the top two RSSI ranges is "10," but 5 for the lowest RSSI range.

In the example parameter score value table 322 of FIG. 3, the Quality of Service (QoS) parameter has a parameter score of "5" for all RSSI ranges. According to an embodiment, QoS is a capability associated with a wireless AP that is related to data transmission priority; for example, either the wireless AP supports QoS or it does not, while in other embodiments, QoS may be weighted or measured in various ways. Some wireless APs support the Wi-Fi Multimedia (WMM) standard related to QoS, which prioritizes network traffic in four categories, from highest to lowest: voice, video, best effort (e.g., most traffic from applications other than voice and video), and background (e.g., print jobs, file downloads, and other traffic not sensitive to latency).

In the example parameter score value table 322 of FIG. 3, the RF band (e.g., 5 GHz, 2.4 GHz, etc.) used by the particular wireless AP under evaluation has different parameter scores depending on the RF band, as well as the RSSI range. For example, if the wireless AP under evaluation uses the 5 GHz band, then the parameter score for the top RSSI range is "10," but "5" for the "medium" RSSI range and "0" for the lowest RSSI range. If the wireless AP under evaluation uses the 2.4 GHz band, then the parameter score for the top and medium RSSI ranges is "0," but "10" for the lowest RSSI range.

Other parameters (e.g., physical layer (PHY) rates, etc.) not included in the example of FIG. 3 may be utilized in various embodiments, and be associated with various parameter scores and/or weighting. According to an embodiment, each parameter value may be weighted, such as according to a predetermined importance of the parameter. For example, if an application executing on the device 302 requires access to the Internet (e.g., web browser, email client, etc.), then a weighting may be applied to the "Internet Access" parameter score.

In the example of FIG. 3, a sample ranking of "XYZ Coffee Wi-Fi" 304, "Municipal Library Wi-Fi" 308, and "Free Wi-Fi Hotspot" 312 may be illustrated. While the example discussed herein utilizes a "three-stage" decision process, it should be understood that more or fewer stages may be utilized, and that available wireless APs may be eliminated from consideration at any stage (e.g., based on one or more particular parameters), or all available wireless APs ultimately may be evaluated based on a total score value, for instance.

In the first decision stage, a determination is made regarding a wireless security setting associated with each of "XYZ Coffee Wi-Fi" 304, "Municipal Library Wi-Fi" 308, and "Free Wi-Fi Hotspot" 312. Because "Municipal Library Wi-Fi" 308 and "Free Wi-Fi Hotspot" 312 are configured with WPA2 and "XYZ Coffee Wi-Fi" 304 has no wireless security setting, and the top "tier" of wireless security settings is WPA2 in this example, "Municipal Library Wi-Fi" 308 and "Free Wi-Fi Hotspot" 312 advance to the second decision stage and "XYZ Coffee Wi-Fi" 304 is dropped from the selection process.

In the second decision stage, a RSSI value associated with each of "Municipal Library Wi-Fi" 308 and "Free Wi-Fi Hotspot" 312 is determined. As discussed herein, this determination may be based on historical data (e.g., based on a previous connection or scanning and stored in database 320), currently-received data, or a mix of both. Because "Municipal Library Wi-Fi" 308 and "Free Wi-Fi Hotspot" 312 both have RSSI values in the top "tier" of RSSI values (e.g., "high," which in the example of FIG. 3 is greater than or equal to −60 dBm), "Municipal Library Wi-Fi" 308 and "Free Wi-Fi Hotspot" 312 advance to the third and final decision stage.

In the third decision stage, various parameter scores (e.g., as illustrated in table 322) are associated with parameters of the wireless APs and the values of those parameters (e.g., as illustrated in table 324), and a determination may be made regarding the parameter score to assign each wireless AP based on the parameters, the parameter values, and the parameter scores corresponding to those values. Because, as described earlier, "Municipal Library Wi-Fi" 308 and "Free Wi-Fi Hotspot" 312 both have RSSI values in the "high" tier of RSSI values; therefore, the parameter scores to be assigned in this example will be determined by reference to the top row of table 322, based on the parameter value for "Municipal Library Wi-Fi" 308 and "Free Wi-Fi Hotspot" 312.

First, whether "Municipal Library Wi-Fi" 308 and "Free Wi-Fi Hotspot" 312 have Internet access is determined, for example by retrieving historical data from table 324, or measuring current conditions, updating historical data based on current conditions, etc. According to database 320, "Municipal Library Wi-Fi" 308 and "Free Wi-Fi Hotspot" 312 both have Internet access (i.e., there is a "Y" in the corresponding column of table 324), so according to table 322, a parameter score of 15 is assigned to each of "Municipal Library Wi-Fi" 308 and "Free Wi-Fi Hotspot" 312, giving them each a total score value of 15.

Next, the Robustness of "Municipal Library Wi-Fi" 308 and "Free Wi-Fi Hotspot" 312 is determined. According to database 320, "Municipal Library Wi-Fi" 308 has "high" robustness and "Free Wi-Fi Hotspot" 312 has "medium" robustness, so according to table 322, a parameter score of 10 is assigned to each of "Municipal Library Wi-Fi" 308 and a parameter score of 5 is assigned to "Free Wi-Fi Hotspot" 312. Therefore, "Municipal Library Wi-Fi" 308 has a total score value of 25 (e.g., 15+10), while "Free Wi-Fi Hotspot" 312 has a total score value of 20 (e.g., 15+10). While summing numerical values is used in the example embodiment, other techniques may be used, such as averaging, etc.

Next, the Interoperability of "Municipal Library Wi-Fi" 308 and "Free Wi-Fi Hotspot" 312 is determined. According to database 320, "Municipal Library Wi-Fi" 308 has "good" Interoperability and "Free Wi-Fi Hotspot" 312 has "bad" Interoperability, so according to table 322, a parameter score of 10 is assigned to "Municipal Library Wi-Fi" 308 and a parameter score of 0 is assigned to "Free Wi-Fi Hotspot" 312. Therefore, "Municipal Library Wi-Fi" 308 has a total score value of 35 (e.g., 15+10+10), while "Free Wi-Fi Hotspot" 312 has a total score value of 20 (e.g., 15+10+0).

Next, the Wi-Fi protocol used by "Municipal Library Wi-Fi" 308 and "Free Wi-Fi Hotspot" 312 is determined. According to database 320, "Municipal Library Wi-Fi" 308 uses 802.11ac and "Free Wi-Fi Hotspot" 312 uses 802.11n, so according to table 322, a parameter score of 10 is assigned to "Municipal Library Wi-Fi" 308 and a parameter score of 5 is assigned to "Free Wi-Fi Hotspot" 312. Therefore, "Municipal Library Wi-Fi" 308 has a total score value of 45 (e.g., 15+10+10+10), while "Free Wi-Fi Hotspot" 312 has a total score value of 25 (e.g., 15+10+0+5). In other embodiments, wireless APs may use multiple Wi-Fi protocols, and the parameter scores may be adjusted as a result (e.g., both scores added to the total score, and average of the parameter scores taken, etc.

Next, it is determined whether "Municipal Library Wi-Fi" 308 and "Free Wi-Fi Hotspot" 312 offer QoS capability. According to database 320, "Municipal Library Wi-Fi" 308 uses QoS and "Free Wi-Fi Hotspot" 312 does not, so according to table 322, a parameter score of 5 is assigned to "Municipal Library Wi-Fi" 308 and a parameter score of 0 is assigned to "Free Wi-Fi Hotspot" 312. Therefore, "Municipal Library Wi-Fi" 308 has a total score value of 50 (e.g., 15+10+10+10+5), while "Free Wi-Fi Hotspot" 312 has a total score value of 25 (e.g., 15+10+0+5+0).

Next, the RF band used by "Municipal Library Wi-Fi" 308 and "Free Wi-Fi Hotspot" 312 is determined. According to database 320, "Municipal Library Wi-Fi" 308 uses 5 GHz and "Free Wi-Fi Hotspot" 312 uses 2.4 GHz, so according to table 322, a parameter score of 10 is assigned to "Municipal Library Wi-Fi" 308 and a parameter score of 0 is assigned to "Free Wi-Fi Hotspot" 312. Therefore, "Municipal Library Wi-Fi" 308 has a total score value of 55 (e.g., 15+10+10+10+10), while "Free Wi-Fi Hotspot" 312 has a total score value of 25 (e.g., 15+10+0+5+0). While that completes the third stage of the decision process for the example embodiment of FIG. 3, it should be understood that additional parameters and parameter scores may be utilized (e.g., PHY rate, etc.).

In the example of FIG. 3, the total score values for "Municipal Library Wi-Fi" 308 and "Free Wi-Fi Hotspot" 312 are then compared. Because the total score value for "Municipal Library Wi-Fi" 308 is 55 and the total score value for "Free Wi-Fi Hotspot" 312 is 25, it is determined that "Municipal Library Wi-Fi" 308 is ranked first and "Free Wi-Fi Hotspot" 312 is ranked second in the preferred selection order to which device 302 will attempt to connect. According to an embodiment, if "Municipal Library Wi-Fi" 308 cannot be connected to, then device 302 will next attempt to connect to "Free Wi-Fi Hotspot" 312.

Figure 4:
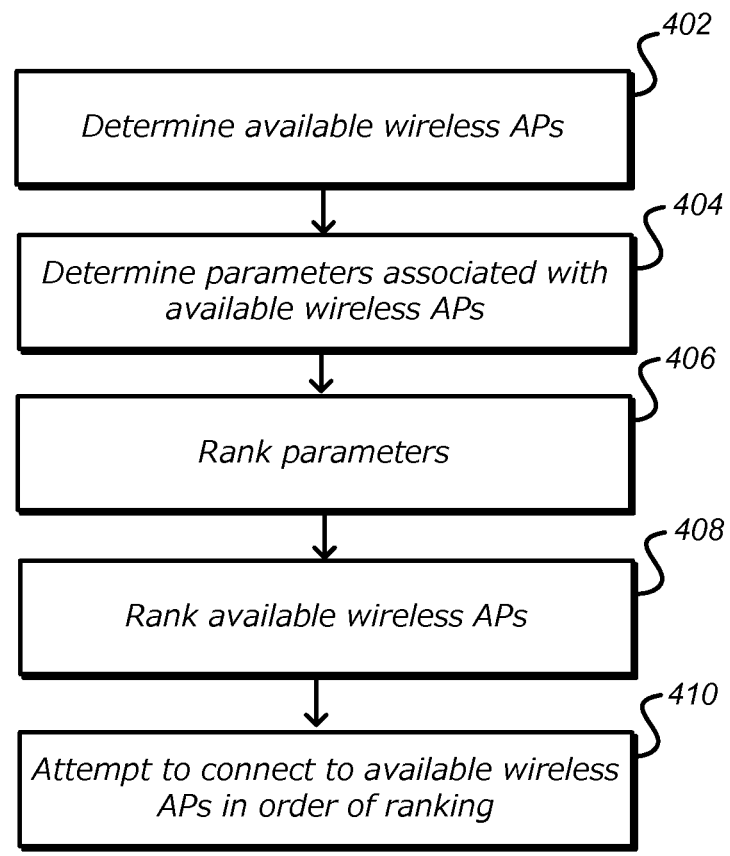
FIG. 4 illustrates an example process for automatically selecting and connecting to a wireless AP in accordance with various embodiments.

FIG. 4 illustrates an example process for automatically selecting and connecting to a wireless AP in accordance with various embodiments. It should be understood that, for any process discussed herein, there can be additional, fewer, or alternative steps performed in similar or alternative orders, or in parallel, within the scope of the various embodiments unless otherwise stated. In accordance with various embodiments, a device can be configured to automatically select and connect to an available wireless AP, despite the wireless AP not being the last-known AP.

For example, a computing device can be configured to identify and/or determine 402 all available wireless APs in the vicinity of the device that are offering a connection. For example, one available AP may be the "last-known," which may comprise an AP to which the device last connected. Instead of automatically re-connecting to the last-known AP, techniques described herein allow for an automated approach of ranking available wireless APs and determining a connection order based at least on the ranking.

According to an embodiment, once the available wireless APs are determined, parameters associated with the available wireless APs, as well as the values of at least some of those parameters, can be determined 404. For example, a parameter may be considered to be a property of a particular wireless AP, such as a wireless security setting, a RF band, a Wi-Fi standard, etc. For example, a wireless AP may have a particular wireless security setting configured, such as WPA2 or WEP, or may have no security setting, and this value may be considered a parameter. In an embodiment, a set of parameters associated with each of the available wireless APs is determined, and each set of parameters may comprise multiple subsets of parameters. For example, a set of parameters for a particular available wireless AP may comprise a wireless security setting, a RF band, and a throughput rate. This set may be divided into a subset of just the wireless security setting and a subset of the remaining parameters, and each available wireless AP may have the same set of parameters, divided into matching subsets. For example, for two available wireless APs, the set of parameters may be a wireless security setting, a RF band, and a throughput rate for each available wireless AP, divided into one subset of just the wireless security setting associated with each of the available wireless APs and another set of the RF band and the throughput rate.

The parameter value data can be collected in a number of different ways, as discussed elsewhere herein. For example, the information can be collected directly from the APs themselves by analyzing the broadcasts or otherwise receiving data from those APs. The data can also include at least some amount of historical data, which was previously collected by the computing device or obtained from another such source. For example, a chain of stores might have similar wireless AP configurations in each store. If a device obtains AP parameter value data for APs in Store A of the chain, the device can use that information when entering Store B in order to attempt to rank the APs in store B. The device can also collect information from Store B that can help to rank the APs when going back to Store A, based potentially on historical information from Stores A and B, as well as AP transmission data collected from Store A. If the device is subsequently in Store C of the chain, the historical information from Stores A and B, as well as AP transmission data collected from Store C, can be used to rank the APs.

According to an embodiment, the parameters for each available wireless AP are ranked 406; for example, corresponding subsets of each available wireless AP may be ranked as part of an approach to determine an overall ranking of the available wireless APs. In an embodiment, given two available wireless APs, the subset described above comprising a wireless security setting for each available wireless AP may be ranked into an order, and the subset described above comprising a RF band and a throughput rate for each available wireless AP may be ranked into an order. A ranking of the available wireless APs 408 may be based on the ranking of one of the subsets, for example. An example of ranking the wireless security setting parameter subset into an order, and then ranking the available wireless APs based on that order is that a wireless security parameter value of WPA2 may be considered in a higher "priority tier" of wireless security settings than WEP. For example, there may be one set of wireless security settings comprising WPA and WPA2, and another set comprising WEP, with the set comprising WPA and WPA2 being associated with a higher priority than the set comprising WEP. If one available wireless AP is configured with WPA2 and the other available wireless AP is configured with WEP, then the available wireless AP with WPA2 may be ranked higher than the other, based on the higher priority of the set of wireless security settings to which the WPA2 wireless security setting belongs.

According to an embodiment, based on the ranking of one or more of the subsets of parameters, the computing device attempts to connect 410 to the top-ranked available wireless AP.

Figure 5:
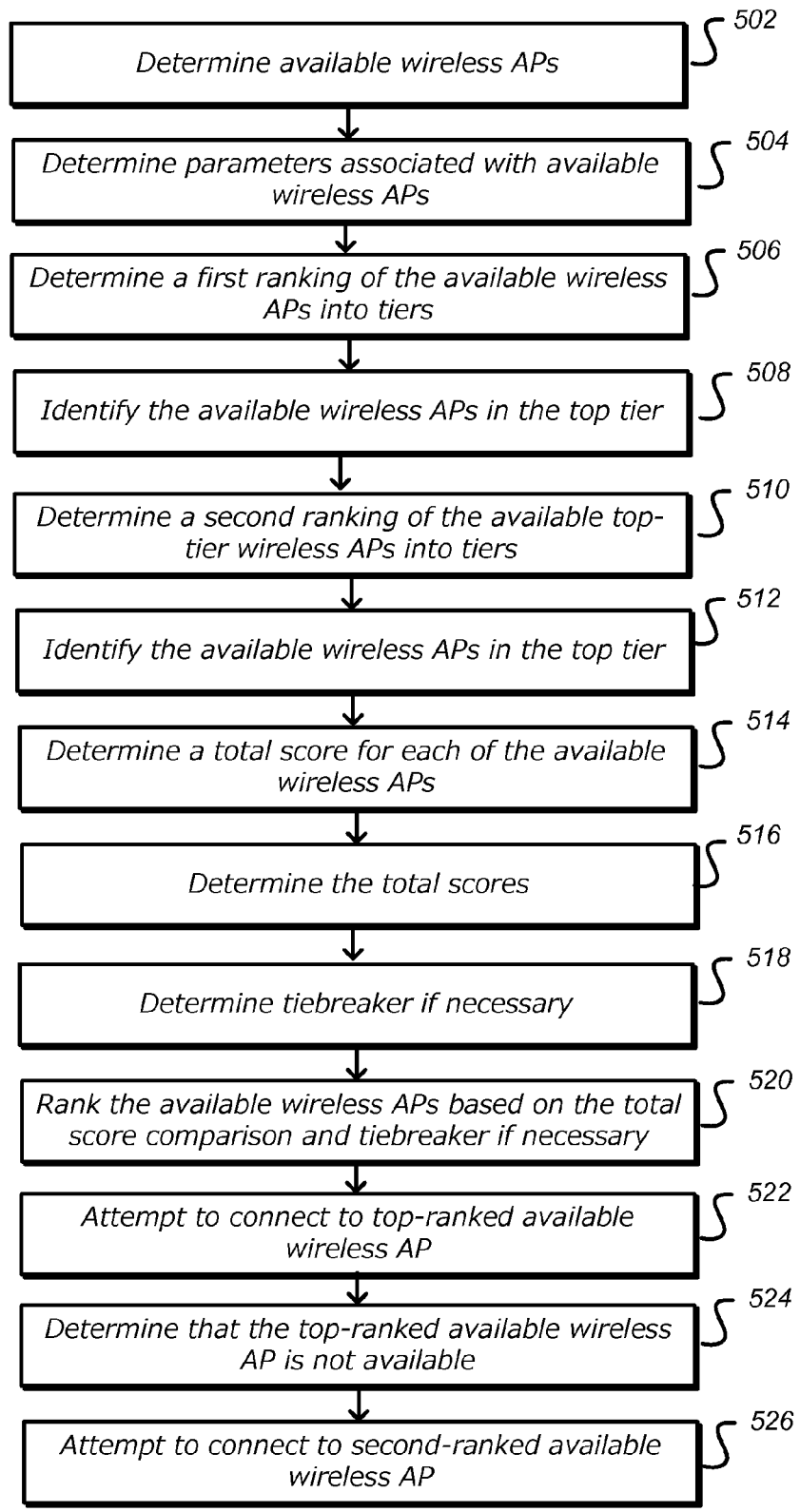
FIG. 5 illustrates an example process for automatically selecting and connecting to a wireless AP in accordance with alternate embodiments.

FIG. 5 illustrates an example process for automatically selecting and connecting to a wireless AP in accordance with alternate embodiments. According to an embodiment, a computing device can be configured to determine 502 all available wireless APs in the vicinity of the device that are offering a connection. For example, one available AP may be the "last-known," which may comprise an AP to which the device last connected. Instead of automatically re-connecting to the last-known AP, techniques described herein allow for an automated approach of ranking available wireless APs and determining a connection order based at least on the ranking.

According to an embodiment, once the available wireless APs are determined, a set of parameters associated with each of the available wireless APs are determined 504. For example, parameters may be wireless security settings, RF frequencies, Wi-Fi standards, etc., which may be divided into multiple subsets of parameters (e.g., wireless security setting may be a subset and RF frequency and Wi-Fi standard may be another subset). Each parameter may be quantified with multiple values. For example, the "wireless security setting" parameter may have parameter values of WPA, WPA2, WEP, etc.

The available wireless APs are then ranked into tiers 506. For example, five of the available wireless APs may be ranked into the "top" tier, 10 available wireless APs may be ranked into the "middle" tier, and 20 available wireless APs may be ranked into the "bottom" tier. According to an embodiment, a tier may correspond to a list of parameters, a range of parameters, individual parameters, etc. For example, it may be determined that five available wireless APs are configured with the WPA2 wireless security setting and ten other available wireless APs are configured with the WEP wireless security setting. The wireless security setting parameter may be one subset of a set of parameters associated with each of the available wireless APs. It may be determined that, of possible wireless security settings, WPA2 is in the highest-ranked range (e.g., the "range" may be WPA2 and WPA) and WEP is the lowest-ranked range (e.g., the range may be WEP and "no security"). Therefore, the available wireless APs are ranked into a "top tier" and a "bottom tier," although multiple tiers are envisioned.

The available wireless APs in the top tier are identified 508, and a next ranking process is initiated that in an embodiment only includes the available wireless APs in the top tier (hereafter referred to as the "remaining available wireless APs"). The remaining available wireless APs are then ranked into another tier 510. According to an embodiment, another parameter of the remaining available wireless APs is used to perform the ranking. For example, a RSSI parameter value is determined for each of the remaining available wireless APs. The RSSI parameter may comprise another subset of the complete set of parameters for the remaining available wireless APs. The RSSI parameter values for each of the remaining available wireless APs are compared; for example, it may be determined that a particular range of RSSI parameter values are most-preferred, while another range of RSSI parameter values are less-preferred. The remaining available wireless APs having RSSI parameter values that correspond to the "most-preferred" range are identified as being in the top tier 512 of the remaining available wireless APs, and a next ranking process is initiated that only includes the top tier 512 of the remaining available wireless APs, as just determined (hereinafter referred to as the "final available wireless APs").

According to an embodiment, total scores are computed 514 for the final available wireless APs. For example, another subset of the entirety of possible parameters may be determined, such as RF frequency and Wi-Fi standard. A parameter score may be assigned to each of the "RF frequency" and "Wi-Fi standard" parameters for each of the final available wireless APs, for example based upon the parameter values. For example, one of the final available wireless APs may use the 802.11n Wi-Fi standard and another may use the 802.11ac standard. In addition, the final available wireless AP using the 802.11n Wi-Fi standard may be in a particular "parameter category," such as having a "high RSSI value," while the final available wireless AP using the 802.11ac Wi-Fi standard may be in a different "parameter category," such as having a "low RSSI value." A parameter score may be assigned that depends upon both the parameter value and the parameter category. For example, a parameter value of 802.11ac Wi-Fi standard may receive a parameter score of "10" if the associated parameter category is "high RSSI value," while a parameter value of 802.11ac Wi-Fi standard may receive a parameter score of "5" if the associated parameter category is "low RSSI value."

Once a parameter score has been assigned for all applicable parameters, the parameter score for each of the final available wireless APs are totaled 516, for example by summing, averaging, etc. The total scores are determined 516, and if a tie exists between the "highest" scores, then a tiebreaker may be used 518. For example, a parameter may be chosen at random, and the final available wireless AP with the "best" parameter value for the tiebreaker parameter is ranked at the top of the connection list. Another example of a tiebreaker is using a timestamp of frame (TSF) value, which has a benefit of being highly unlike to be the same between the tied final available wireless APs.

A final ranking of the final available wireless APs may be performed 520. The ranking may comprise a ranked list, and the computing device will attempt to connect 522 to the top-ranked final available wireless APs on the list. If the top-ranked final available wireless AP is not available to connect 524, then the computing device may attempt to connect to the second-ranked final available wireless AP 526.

Figure 6:
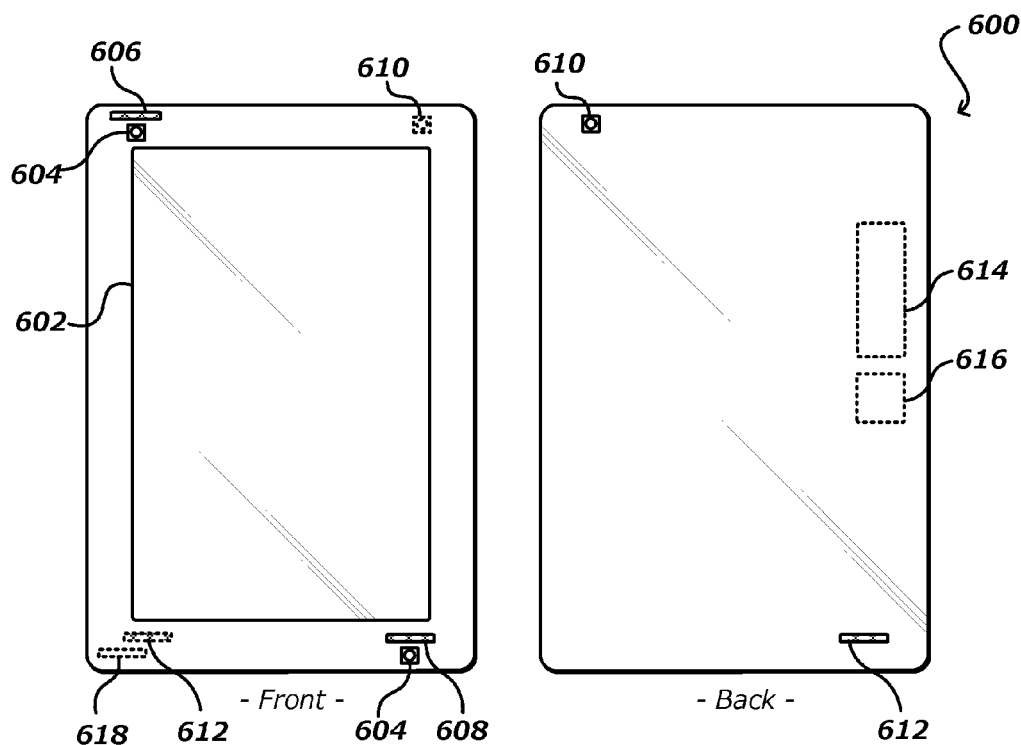
FIG. 6 illustrates front and back views of an example portable computing device that can be used in accordance with various embodiments.

FIG. 6 illustrates front and back views of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
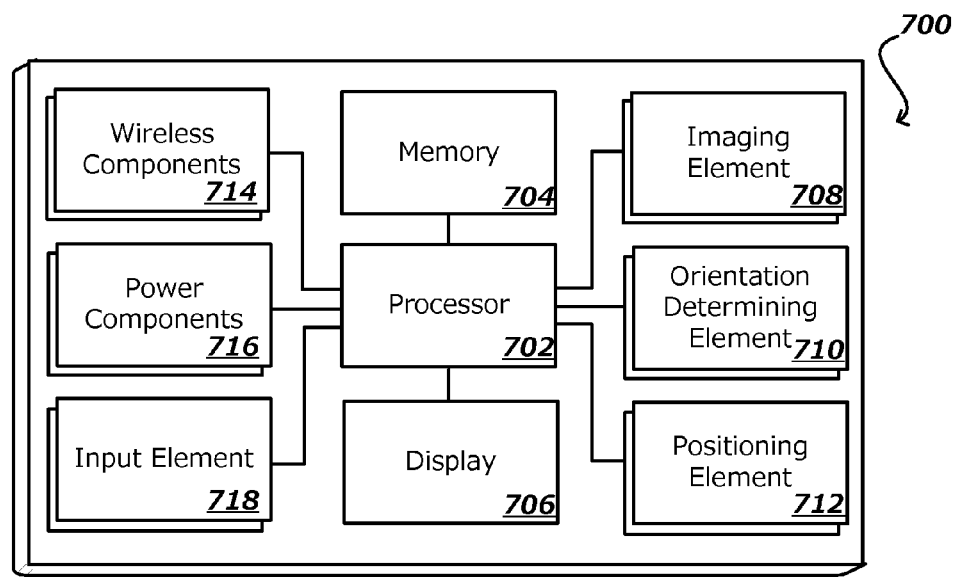
FIG. 7 illustrates an example set of basic components of a portable computing device, such as the device described with respect to FIG. 6.

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device may include some type of display element 706, such as a touch screen, electronic ink (e-ink), organic light emitting diode (OLED) or liquid crystal display (LCD), although devices such as portable media players might convey information via other means, such as through audio speakers. For devices such as servers, however, there may be no conventional display screen or speaker mechanism, with lights or other elements used to convey information.

As discussed, the device in many embodiments may include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device, although such elements are typically utilized primarily in mobile devices and may not be present in many other types of devices. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in some embodiments can include a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
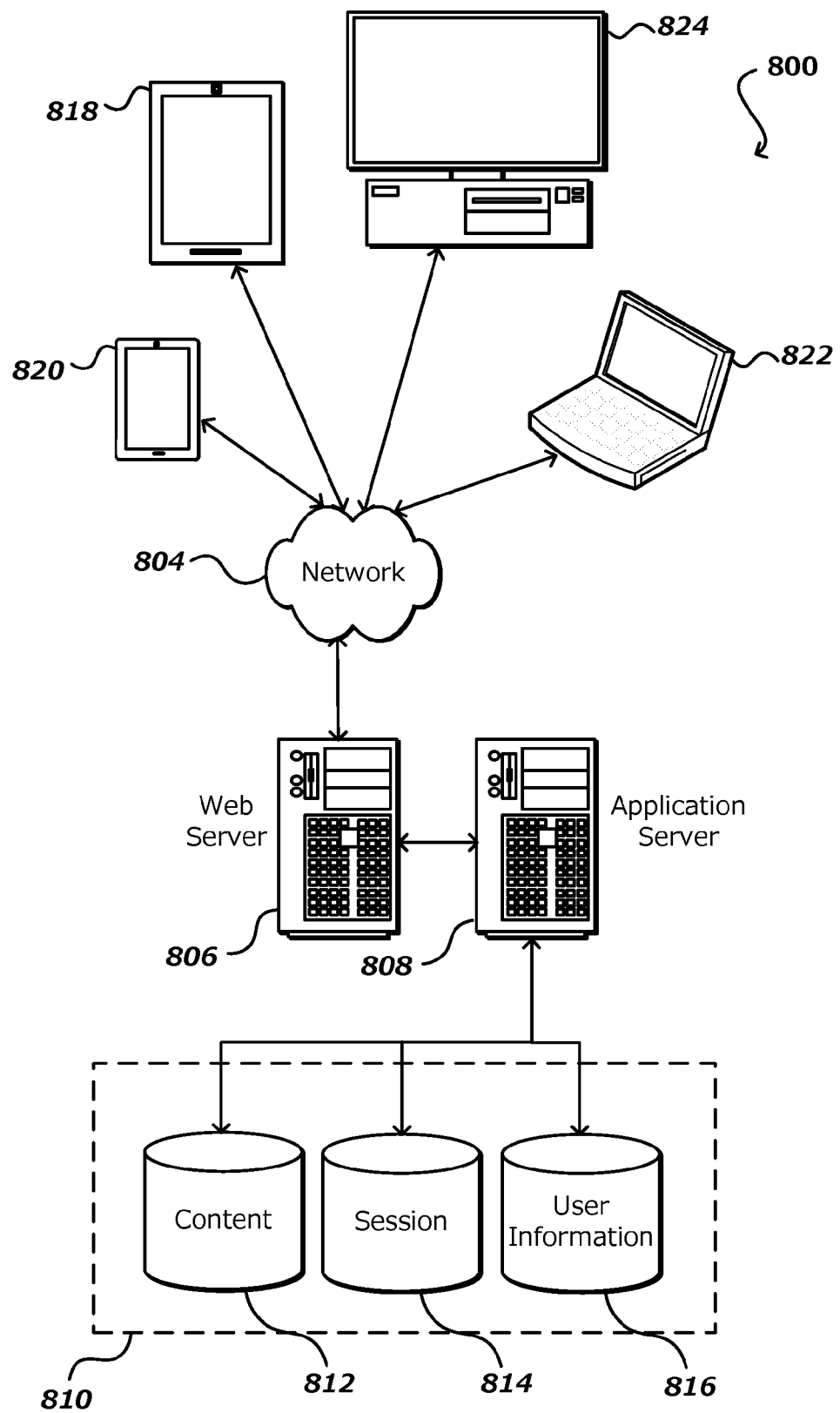
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes electronic client devices 818, 820, 822, and 824, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client devices 818, 820, 822, and 824 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 818, 820, 822 and 824. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
    determining, by a computing device having a wireless fidelity (Wi-Fi) network adapter, a first wireless security protocol associated with a first Wi-Fi access point (AP);
    determining a second wireless security protocol associated with a second Wi-Fi AP;
    determining a first received signal strength indicator (RSSI) value associated with the first Wi-Fi AP;
    determining a second received signal strength indicator (RSSI) value associated with the second Wi-Fi AP;
    analyzing the first wireless security protocol, the second wireless security protocol, the first RSSI value, and the second RSSI value to select an initial Wi-Fi AP of the first Wi-Fi AP or the second Wi-Fi AP for connection according to at least one evaluation criterion, independent of the computing device having last connected to the second Wi-Fi AP;
    determining a first set of parameters describing the first Wi-Fi AP, wherein the first Wi-Fi AP has been previously connected to by the computing device, the first set of parameters having been stored on the computing device at the time of the most recent previous connection;
    determining a second set of parameters describing the second Wi-Fi AP, wherein the second Wi-Fi AP has been previously connected to by the computing device, the second set of parameters having been stored on the computing device at the time of the most recent previous connection;
    determining a first total score associated with the first Wi-Fi AP based at least in part on scoring first respective parameter values for the first set of parameters;
    determining a second total score associated with the second Wi-Fi AP based at least in part on scoring second respective parameter values for the second set of parameters;
    determining that the first total score is higher than the second total score; and
    connecting, by the computing device, to the first Wi-Fi AP, based at least on the comparison of the first total score and the second total score.

2. The computer-implemented method of claim 1,
    wherein the first set of parameters comprise at least: a first physical layer (PHY) rate, a first quality of service (QoS) setting, a first internet access availability determination, a first internet connection quality value, a first Wi-Fi AP standard determination, and a first Wi-Fi AP frequency band determination; and
    wherein the second set of parameters comprise at least: a second physical layer (PHY) rate, a second quality of service (QoS) setting, a second internet access availability determination, a second internet connection quality value, a second Wi-Fi AP standard determination, and a second Wi-Fi AP frequency band determination.

3. The computer-implemented method of claim 1, further comprising:
    determining that the first Wi-Fi AP is not available for connection;
    determining a third wireless security setting associated with a third Wi-Fi access point (AP),
    determining a third received signal strength indicator (RSSI) value associated with the third Wi-Fi AP; and
    analyzing the second wireless security protocol, the third wireless security protocol, the second RSSI value, and the third RSSI value to select a next Wi-Fi AP of the second Wi-Fi AP or the third Wi-Fi AP for connection according to the at least one evaluation criterion, independent of the computing device having last connected to the second Wi-Fi AP; and
    connecting, by the computing device, to the next Wi-Fi AP.

4. A computer implemented method, comprising:
    determining, by a computing device, presence of a first wireless access point (AP) and a second wireless AP, wherein the computing device last connected to the second wireless AP;
    determining, by the computing device, a first set of parameters associated with the first wireless AP, the first set of parameters comprising a first subset of parameters and a second subset of parameters;
    determining, by the computing device, at least a second set of parameters associated with the second wireless AP, the second set of parameters comprising a third subset of parameters and a fourth subset of parameters;
    determining a first total score associated with the first wireless AP, based at least in part on the first subset of parameters and the third subset of parameters;
    determining a second total score associated with the second wireless AP, based at least in part on the second subset of parameters and the fourth subset of parameters;
    determining that the first total score is equal to the second total score;
    selecting a tiebreaker parameter, the tiebreaker parameter being associated with the first wireless AP and the second wireless AP;
    determining a first value of the tiebreaker parameter, the first value of the tiebreaker parameter associated with the first wireless AP;
    determining a second value of the tiebreaker parameter, the second value of the tiebreaker parameter associated with the second wireless AP, wherein the second value of the tiebreaker parameter has lesser value than the first value of the tiebreaker parameter; and
    connecting, by the computing device, to the first wireless AP, based in part on the second value of the tiebreaker parameter.

5. The computer implemented method of claim 4, wherein the first subset of parameters comprises a first wireless security setting associated with the first wireless AP and the third subset of parameters comprises a second security setting associated with the second wireless AP, and determining a first ranking order of the first subset of parameters and the third subset of parameters comprises:
    determining, from information stored on the computing device, at least a first set of wireless security settings and a second set of wireless security settings;

determining that the first wireless security setting corresponds to the first set of wireless security settings;

determining that the second wireless security setting corresponds to the second set of wireless security settings; and determining that the first wireless security setting is ranked higher than the second wireless security setting, based at least in part on the first set of wireless security settings being associated with a higher priority than the second set of wireless security settings.

6. The computer implemented method of claim 5, wherein the second subset of parameters comprises a first received signal strength indicator (RSSI) value associated with the first wireless AP and the fourth subset of parameters comprises a second RSSI value associated with the second wireless AP, and determining a second ranking order of the second subset of parameters and the fourth subset of parameters comprises:

determining, from information stored on the computing device, a first range of RSSI values and a second range of RSSI values;

determining that the first RSSI value corresponds to the first range of RSSI values, wherein the first range of RSSI values is associated with a first priority value;

determining that the second RSSI value corresponds to the second range of RSSI values, wherein the second range of RSSI values is associated with a second priority value lower than the first priority value; and determining that the first RSSI value is ranked higher than the second RSSI value, based in part on the first and second priority values.

7. The computer implemented method of claim 5, wherein a first parameter of the second subset of parameters and a second parameter of the fourth subset of parameters correspond to a first parameter category, and a third parameter of the second subset of parameters and a fourth parameter of the fourth subset of parameters correspond to a second parameter category, and determining the second ranking order further comprises:

determining a first parameter score for the first parameter and a second parameter score for the second parameter, based at least in part on a value of the first parameter, a value of the second parameter, and the first parameter category;

determining a third parameter score for the third parameter and a fourth parameter score for the fourth parameter, based at least in part on a value of the third parameter, a value of the fourth parameter, and the second parameter category; and determining that the second subset is ranked higher than the fourth subset.

8. The computer implemented method of claim 7, wherein the first parameter category comprises Internet access, and determining the first parameter score for the first parameter further comprises:

determining that the computing device requires Internet access;

determining, from information stored on the computing device, a first weighting value associated with the determination that the computing device requires Internet access; and determining the first wireless AP offers Internet access, based at least in part on the value of the first parameter; and modifying the first parameter score for the first parameter, based at least in part on the weighting value.

9. The computer implemented method of claim 4, further comprising:

identifying a first application executing on the computing device; and determining that the computing device requires Internet access, based at least in part on identifying the first application.

10. The computer implemented method of claim 4, wherein each of the second subset of parameters and the fourth subset of parameters includes one of: a wireless security setting, a RSSI value, a physical layer (PHY) rate, a quality of service (QoS) setting, an internet access availability determination, an internet connection quality value, a wireless AP standard determination, and a wireless AP frequency band determination.

11. The computer implemented method of claim 4, wherein at least a subset of the first set of parameters is determined from historical values stored for an associated AP.

12. A computing device, comprising:

at least one processor;

a wireless network adapter; and memory including instructions that, when executed by the processor, cause the computing device to:

determine presence of a first wireless access point (AP) and a second wireless AP wherein the computing device last connected to the second wireless AP;

determine a first set of parameters associated with the first wireless AP, the first set of parameters comprising at least a first subset of parameters and a second subset of parameters;

determine a second set of parameters associated with the second wireless AP, the second set of parameters comprising at least a third subset and a fourth subset;

determine a first total score associated with the first wireless AP, based at least in part on the first subset of parameters and the third subset of parameters;

determine a second total score associated with the second wireless AP, based at least in part on the second subset of parameters and the fourth subset of parameters;

determine that the first total score is equal to the second total score;

select a tiebreaker parameter, the tiebreaker parameter being associated with the first wireless AP and the second wireless AP;

determine a first value of the tiebreaker parameter, the first value of the tiebreaker parameter associated with the first wireless AP;

determine a second value of the tiebreaker parameter, the second value of the tiebreaker parameter associated with the second wireless AP, wherein the second value of the tiebreaker parameter has less value than the first value of the tiebreaker parameter; and connect to the first wireless AP, based in part on the second value of the tiebreaker parameter.

13. The computing device of claim 12, wherein the first subset of parameters comprises a first wireless security setting associated with the first wireless AP and the third subset of parameters comprises a second security setting associated with the second wireless AP, and the instructions, when executed, further cause the computing system to:

determine, from information stored on the computing device, a first set of wireless security settings and a second set of wireless security settings;

determine that the first wireless security setting corresponds to the first set of wireless security settings;

determine that the second wireless security setting corresponds to the second set of wireless security settings; and determine that the first wireless security setting is ranked higher than the second wireless security setting, based at least in part on the first set of wireless security settings being associated with a higher priority than the second set of wireless security settings.

14. The computing device of claim 13, wherein the second subset of parameters comprises a first received signal strength indicator (RSSI) value associated with the first wireless AP and the fourth subset of parameters comprises a second RSSI value associated with the second wireless AP, and wherein the instructions, when executed, further cause the computing system to:

determine, from information stored on the computing device, a first range of RSSI values and a second range of RSSI values;

determine that the first RSSI value corresponds to the first range of RSSI values, wherein the first range of RSSI values is associated with a first priority value;

determine that the second RSSI value corresponds to the second range of RSSI values, wherein the second range of RSSI values is associated with a second priority value lower than the first priority value; and determine that the first RSSI value is ranked higher than the second RSSI value, based in part on the first and second priority values.

15. The computing device of claim 13, wherein a first parameter of the second subset of parameters and a second parameter of the fourth subset of parameters correspond to a first parameter category, and a third parameter of the second subset of parameters and a fourth parameter of the fourth subset of parameters correspond to a second parameter category, and wherein the instructions, when executed, further cause the computing system to:

determine a first parameter score for the first parameter and a second parameter score for the second parameter, based in part on a value of the first parameter, a value of the second parameter, and the first parameter category;

determine a third parameter score for the third parameter and a fourth parameter score for the fourth parameter, based in part on a value of the third parameter, a value of the fourth parameter, and the second parameter category; and determine that the second subset is ranked higher than the fourth subset.

16. The computing device of claim 12, wherein the first parameter category comprises Internet access, and wherein the instructions, when executed, further cause the computing system to:

determine that the computing device requires Internet access;

determine, from information stored on the computing device, a first weighting value associated with the determination that the computing device requires Internet access; and determine the first wireless AP offers Internet access, based in part on the value of the first parameter; and modify the first parameter score for the first parameter, based in part on the weighting value.

17. The computing device of claim 12, wherein the instructions, when executed, further cause the computing system to:

identify a first application executing on the computing device; and determine that the computing device requires Internet access, based at least in part on identifying the first application.

18. The computing device of claim 12, wherein each of the second subset of parameters and the fourth subset of parameters includes one of: a wireless security setting, a RSSI value, a physical layer (PHY) rate, a quality of service (QoS) setting, an internet access availability determination, an internet connection quality value, a wireless AP standard determination, and a wireless AP frequency band determination.

* * * * *